United States Patent [19]
Deadman et al.

[11] Patent Number: 5,949,765
[45] Date of Patent: Sep. 7, 1999

[54] VIRTUAL MULTIPLEXING OF TELEPHONY LINES

[75] Inventors: Richard Deadman, Ottawa; Pat Orchard, Nepean, both of Canada

[73] Assignee: Mitel Corporation, Kanata, Canada

[21] Appl. No.: 08/815,596

[22] Filed: Mar. 12, 1997

[51] Int. Cl.$^6$ .............................. H04L 12/16; H04J 3/02; H04M 11/00; H04B 1/38
[52] U.S. Cl. ............................................. 370/271; 370/537
[58] Field of Search ................................ 370/270, 271, 370/532, 535, 537, 538, 540; 375/260, 222; 379/93.07

[56] References Cited

U.S. PATENT DOCUMENTS

| | | | |
|---|---|---|---|
| 4,864,567 | 9/1989 | Giorgio | 370/359 |
| 5,390,239 | 2/1995 | Morris et al. | 379/93.08 |
| 5,673,257 | 9/1997 | Sharma et al. | 370/535 |
| 5,809,070 | 9/1998 | Krishnan et al. | 379/93.07 |

FOREIGN PATENT DOCUMENTS

| | | |
|---|---|---|
| 0695072 | 1/1996 | European Pat. Off. . |
| 0712068 | 5/1996 | European Pat. Off. . |
| 2305331 | 4/1997 | United Kingdom . |
| 9602049 | 1/1996 | WIPO . |

*Primary Examiner*—Chau Nguyen
*Assistant Examiner*—Phuongchau Ba Nguyen
*Attorney, Agent, or Firm*—Jones, Day, Reavis & Pogue

[57] ABSTRACT

The present invention provides a multiplexor architecture and method that manipulates multiple telephony lines onto one virtual line which can then be monitored and controlled by an application on a desktop computer originally designed to handle only a single line. The multiplexor of the present invention provides transparent telephony line manipulation which to the telephony line manager, appears as a telephony service provider component. To the telephony service provider component, the present invention appears as the telephony line manager.

7 Claims, 3 Drawing Sheets

VIRTUAL MULTIPLEXING OF TELEPHONY LINES

FIELD OF THE INVENTION

This invention relates in general to the field of providing telephony control through a desktop computer and in particular provides a multiplexor architecture and method to multiplex multiple telephony lines onto one virtual line which can then be monitored and controlled by a single line telephony application on a desktop computer. The multiplexor of the present invention is utilized as an intermediary between the telephony application and the telephony service provider to facilitate transparent line manipulation.

BACKGROUND OF THE INVENTION

With the advent of increasingly sophisticated computer technology infrastructures, there has been a gradual movement toward facilitating and implementing telephony functions on desktop computers. Such telephony functions are provided by a desktop computer application, which communicates with a telephony line manager, which in turn, communicates with a telephony service provider component that provides the telephony line.

The Telephony Application Programming Interface (TAPI) specification of Microsoft® Windows™ is an example of a telephony line manager that allows first party call signal control to be provided to applications on desktop computers. Using a telephony line manager, like TAPI, applications can make calls, be notified about calls, answer calls, hold calls and perform other switch related functions as if the application is the end-point of the call.

Utilizing a telephony line manager, like TAPI, an application can access multiple telephone lines, with one or more addresses associated with each line. However, the mapping of addresses to lines is considered static. Each address can have one or more calls associated with it. For traditional analogue phone lines (often called POTS for Plain Old Telephone Service), each line, and therefore each address, can only have one active call at a time. Additional calls can be associated with the line but be on hold at the telephony switch.

Similarly, a telephony line manager, like TAPI, defines phone devices to represent the actual hardware as opposed to the logical line on which calls take place. A telephony line can appear on multiple phones and a phone can handle multiple lines. A telephony line manager, like TAPI, has been designed with the assumption that multiple line support must be built into the application.

The telephony line manager architecture, such as TAPI, provides for a very flexible mapping that attempts to encompass most desktop system configurations. However, for simplicity sake, many popular desktop applications, such as ACT! (Beta) by Semantec® and Algorythms PhoneKits™, facilitate call monitoring or control for only one line and one address at a time. They are not capable of handling multiple phone lines simultaneously. This limitation severely restricts the application's use on desktops with multiple phone lines, where there is a desire to use the application, but the application can only handle one of the multiple lines brought to the desktop.

Some of the limitations of the first-party call signal control of a telephony line manager, like TAPI, are provided by a telephony service provider component, such as a TSPI bridge to TSAPI (Third-Party Telephony Standard). While this TSAPI to TAPI bridge provides pseudo third-party call signal control and through the telephony service provider component, allows the telephony line manager and TSAPI to work together, it does not provide multiple line handling to applications only designed to handle a single line.

SUMMARY OF THE INVENTION

The present invention provides a multiplexor architecture and method that manipulates multiple telephony lines onto one virtual line which can then be monitored and controlled by an application on a desktop computer originally designed to handle only a single line. The multiplexor of the present invention provides transparent telephony line manipulation which to the telephony line manager, appears as a telephony service provider component. To the telephony service provider component, the present invention appears as the telephony line manager.

BRIEF DESCRIPTION OF THE DRAWINGS

A detailed description of the preferred embodiment is provided herein below with reference to the following drawings, in which.

DETAILED DESCRIPTION OF THE PREFERRED EMBODIMENT

Figure 1:
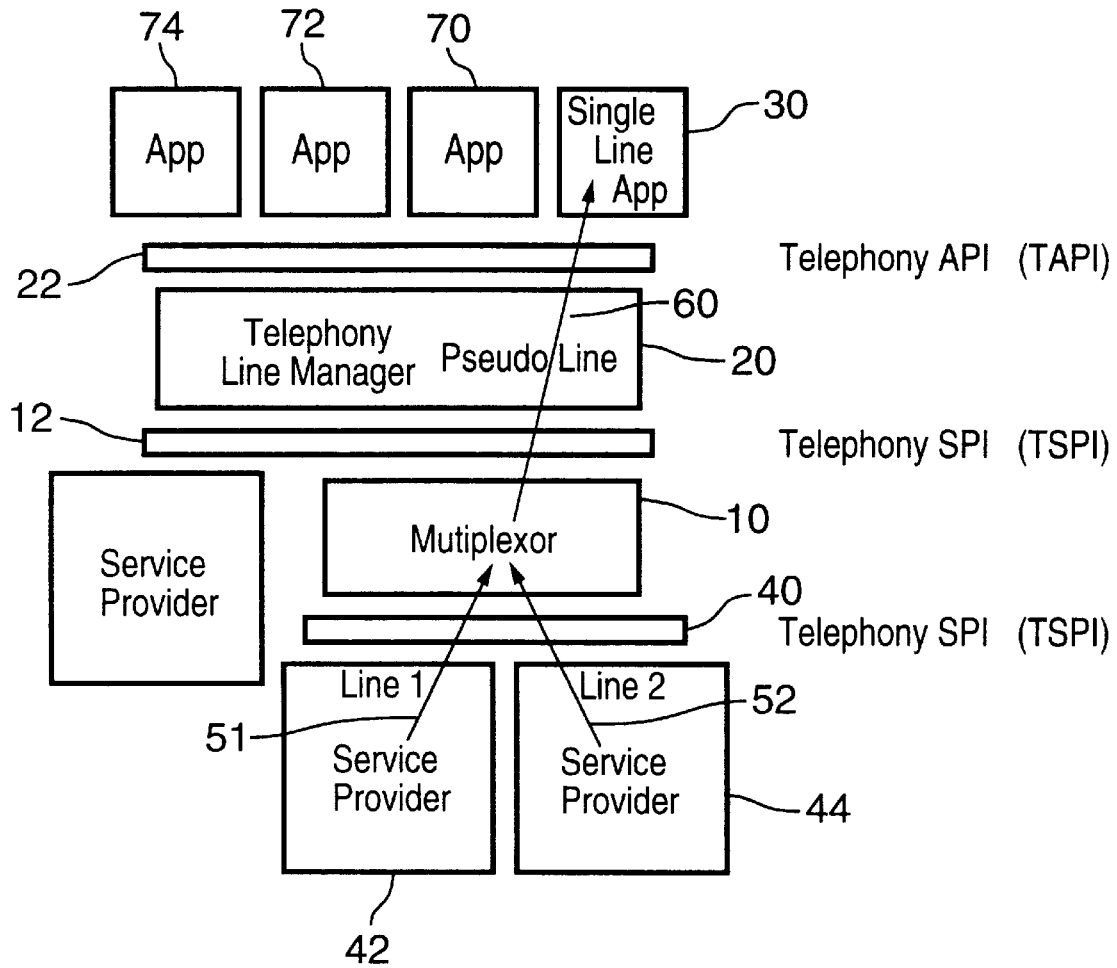
FIG. 1 is a block diagram of the various interface layers incorporating the multiplexor in the architecture and method of the present invention according to the preferred embodiment.

Turning to FIG. 1, the architecture of the present invention is shown in accordance with the preferred embodiment, the multiplexor 10 is provided as software, or a software library such as a dynamically linked library (DLL) residing on a standard desktop computer interface. The multiplexor 10 communicates through function calls of a service provider interface 12 to a telephony line manager 20, which, in turn communicates to a single telephony line application 30 through an application interface 22. The multiplexor 10 also interfaces through function calls of service provider interface 40 to one or more service providers 42 and 44. In the preferred embodiment, communication with the telephony line manager 20 is facilitated using the Telephony Application Programmer's Interface (TAPI), provided by Microsoft®, and communication with the service provider components 42 and 44 is facilitated using the telephony service provider interface (TSPI) by Microsoft Corporation. While the present invention is described with respect to these interfaces, it is within the scope of the present invention that other interfaces could be used.

In order to provide multiplexing of multiple lines 51 and 52 onto a single virtual line 60 monitored or controlled by a single line application 30, the multiplexor 10 of the present invention is inserted between the telephony line manager 20 and service provider components 42 and 44. This is necessary to provide the required transparency of the multiplexor 10 to the application 30, the telephony line manager 20 and the service provider components, 42 and 44.

The telephony line manager 20, and therefore the application 30 accessing the telephony line signal, sees the virtual line 60 as an actual physical device from the multiplexor 10.

The multiplexor 10 represents some or all of the service provider lines 51 and 52 to the telephony line manager 20 itself, asae new multiplexed service provider. To the service provider components 42 and 44, the multiplexor 10 appears to be the telephony line manager 20.

As an additional feature, the actual lines 51 and 52 may be made individually available by the multiplexor 10 to multi-line telephony applications 70, 72 and 74 in addition to virtual line 60. This allows line 51 and line 52 to appear as a single line to the multi-line application 70, 72 or 74. For a single-line application 30, the two lines 51 and 52 are managed as a virtual line 60.

Figure 2:
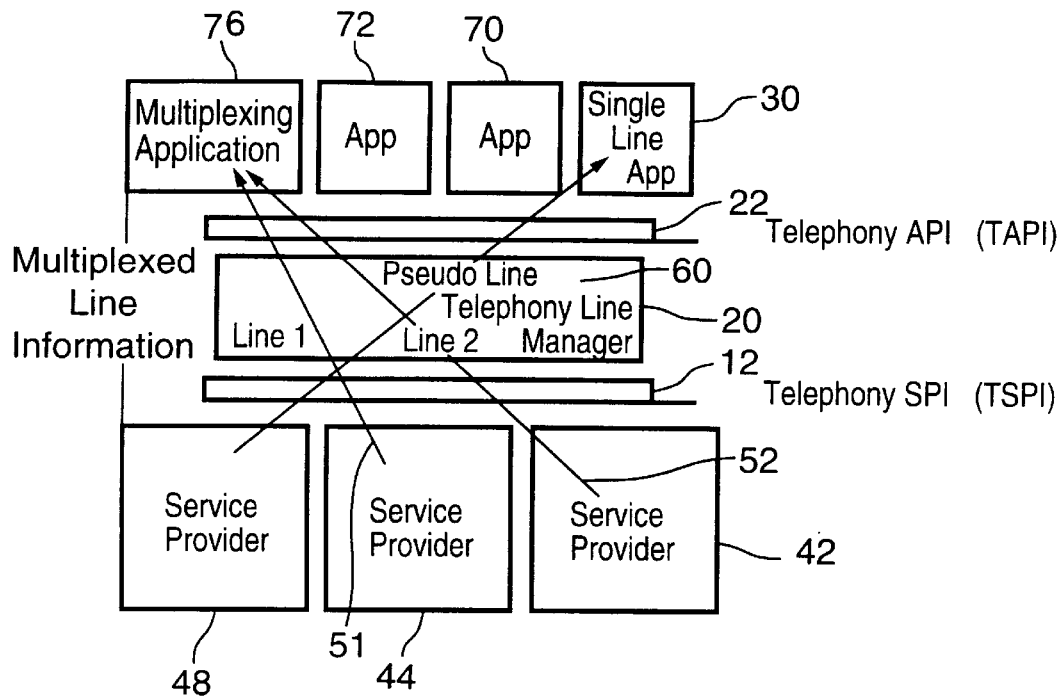
FIG. 2 is a block diagram of the various interface layers in an alternate embodiment of the present invention.

Turning to FIG. 2, an alternate embodiment of the present invention is shown. This alternate embodiment involves creating a multiplexing component with two parts: a multi-line application 76 and a multiplexing service provider 48. The multi-line application 76 of the multiplexor utilizes the telephony line manager 20 through application interface 22 to communicate with one or more lines, such as lines 51 and 52 which originate from service provider components 44 and 42, respectively. Multi-line application 76 then re-exports the control of lines 51 and 52 to service provider 48 and back to the telephony line manager 20, through service provider interface 12, then on to application 30 as a virtual line.

This embodiment removes the requirement of having the multiplexor 10 act as a telephony line manager to all service providers with which it wishes to multiplex.

Figure 3:
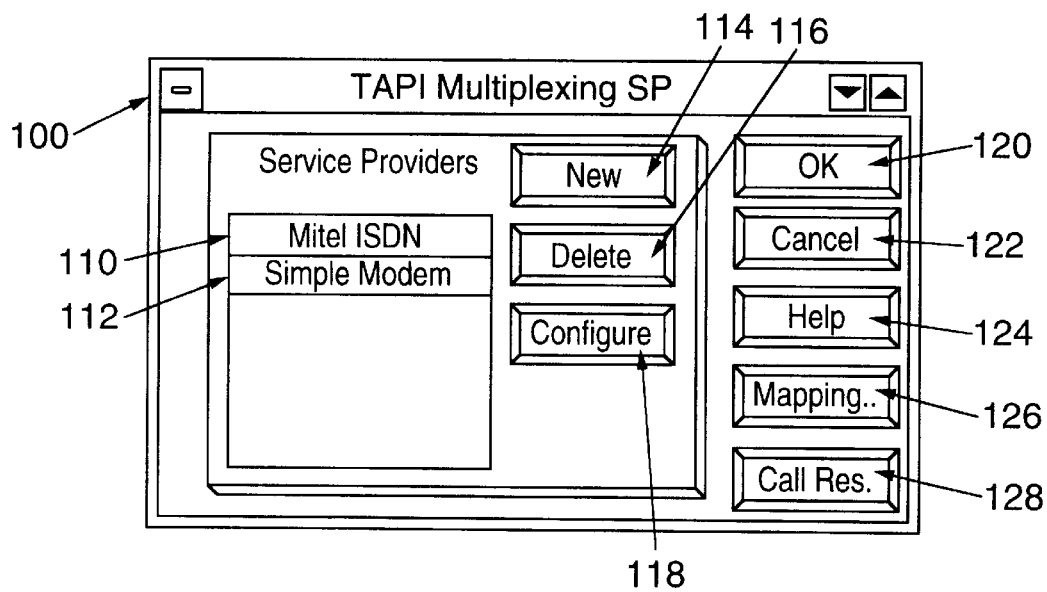
FIG. 3 is an example of a computer screen for configuration of the multiplexor of the present invention.

Turning to FIG. 3, the computer screen 100 for configuration of the present invention is shown. The configuration is applicable to the embodiments described in FIGS. 1 and 2 above.

The multiplexor of the present invention implements both ends of the service provider protocol. That is, the multiplexor appears to the telephony service providers 42 and 44 as an application using the telephony line manager 20 and to the telephony line manager 20 as a multiplexing service provider 48 and the application 76. This enables the architecture of the present invention to be installed and configured by the telephony line manager 20 as a regular telephony service provider. The multiplexor of the present invention is presented and installed as a service provider component in the telephony line manager 20 just like any other telephony service provider component.

Service provider components which can be manipulated by the multiplexor of the present invention are listed as items 110 and 112 on computer screen 100. A new service provider component can be added by activating new button 114. An existing service provider component, such as item 110 or 112 can be removed from management by the multiplexor of the present invention by activating button 116. A currently installed service provider component 110 or 112 can be configured by activating button 118. From the configuration computer screen 100, a user is able to specify and call up the configuration panels for service providers 42 and 44 which the multiplexor uses to control lines 51 and 52. The multiplexor of the present invention uses its own control panel to install service provider components and specify how these services will be presented to the telephony line manager. The service provider components are then called using their native telephony line manager configuration panels through the configuration button 118 on computer screen 110. To the service provider components, it appears that the telephony line manager 20 itself is installing them. Callback hooks are provided to the service providers to emulate the telephony line manger 20 call back hooks. The callback hook that is provided to these service providers is actually owned by the multiplexor of the present invention. When a service provider such as 42 or 44 has information to convey to the telephony line manager 20, this hook is used. The multiplexor then intercepts this information and determines how the information must be mapped (multiplexed) before it calls a telephony line manager callback hook. The multiplexor of the present invention maintains internal mapping and state tables to monitor the configuration, current state and features of each service provider component and virtual line being managed.

Mapping and related functions provided by the multiplexor of the present invention are configured by activating mapping button 126. By choosing one or more service provider components, such as items 110 and 112, and activating mapping button 126, the telephony lines associated with the chosen service provider components can be configured for multiplexing on a virtual line. Each service provider component may handle one or more actual lines, and the particular line or lines of each service provider component can be configured for mapping onto a virtual line. The present invention also allows multiple virtual lines to be configured. After activating mapping button 126, the multiplexor of the present invention prompts for the specification of the address to be presented to a single line application representing the virtual line being configured. Also, after activating mapping button 126, the multiplexor of the present invention will check to make sure that a common interface version range is supported by all lines from all service provider components that are multiplexed onto a virtual line. This is to ensure that all service provider components support overlapping versions of the interface with the telephony line manager 20 so that a consistent virtual line, with uniform features can be presented. Also, after activating the mapping button 126, the multiplexor of the present invention will prompt for instructions on how to map multiple call signals which may become active at the same time on the same virtual line. While some service provider components allow multiple call signals to be active on the same line, the multiplexor can be optionally configured to either allow multiple call signals to proceed simultaneously, or to allow only one call signal at a time on the same virtual line, depending on the needs and functions to be provided to the single line application. The multiplexor of the present invention can also be configured to drop or ignore call signals from one or more service provider components when multiple call signals appear on the same virtual line.

By activating the call resolution button 128, the multiplexor controls the configuration of which outgoing line of which service provider component should be used when the virtual line is chosen by the single line application for instigating or originating a call. Policies such as primary/secondary or round-robin selection may be provided.

Upon activation of help button 124, on line help on use of the multiplexor of the present invention is provided. Upon activation of cancel button 122, the configuration performed during the current session is abandoned.

Upon activation of OK button 120, all configuration performed through computer screen 100 in the current session is activated.

Figure 4:
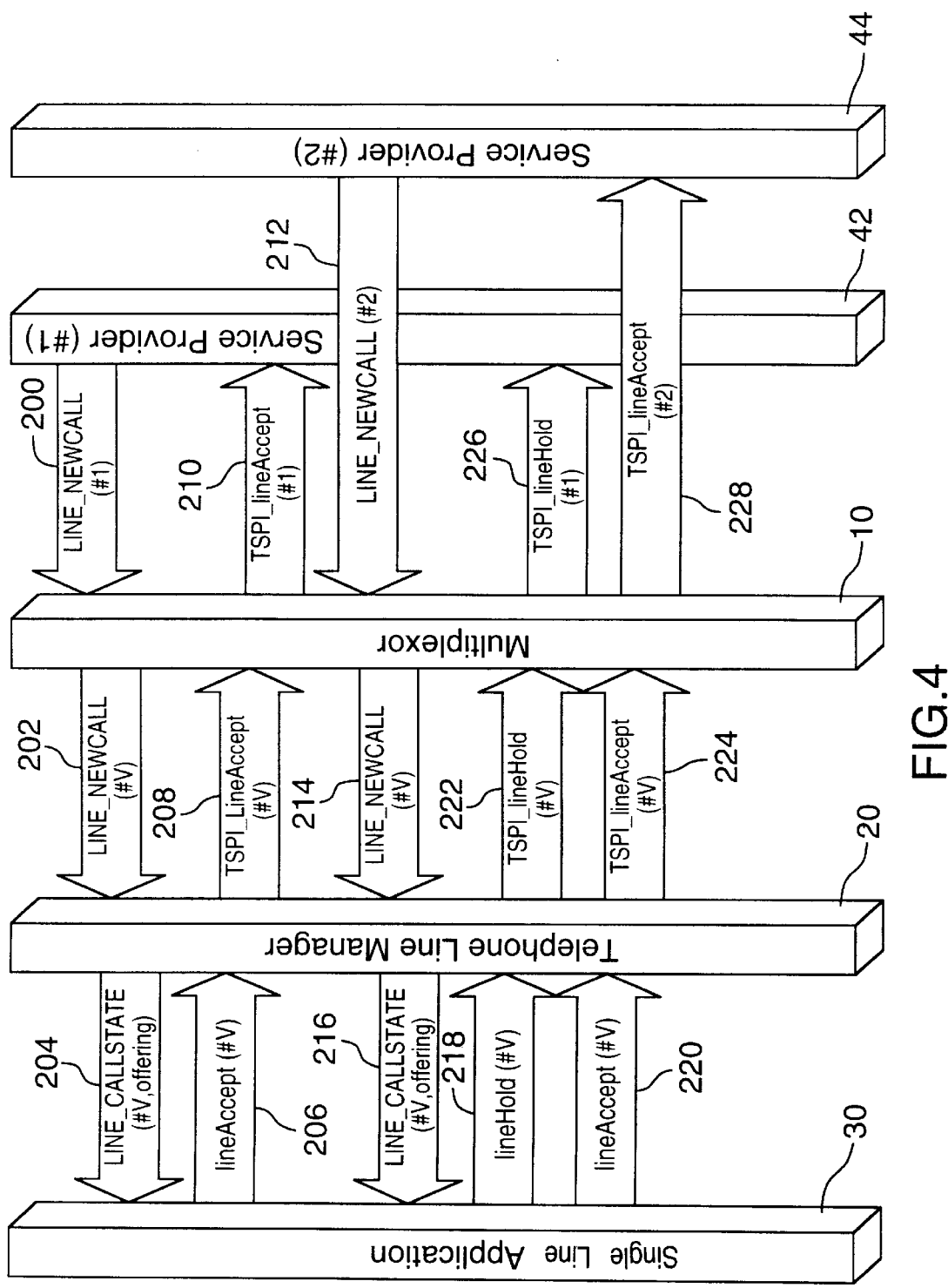
FIG. 4 is an interaction diagram representing how the present invention interacts with the telephony line manager.

Turning to FIG. 4, an interaction diagram of the present invention is shown. This represents how the multiplexor of the present invention interacts with the telephony line manager and the existing telephony service provider components.

The example of FIG. 4 outlines how a single line application 30 handles call signals from two service providers 42 and 44 on a single virtual line. While this example deals with the situation where one call signal comes in through each of the service provider components 42 and 44, the same procedure can be used to handle a combination of multiple call signals on multiple lines connected to multiple service provider components.

The interaction can be described as follows:

1. When a new call signal appears on one of the lines of service provider component 42, the service provider component 42 sends a LINE_NEWCALL message 200 to the callback function registered with the service provider component 42 when telephony line manager 30 was started. This callback function is not the actual telephony line manager 20 callback function but is one provided by the multiplexor 10 of the present invention.
2. The multiplexor 10 uses its internal mapping tables and state machine tables to map the new call signal to a virtual device and sends the appropriate message 202 presenting virtual line #V to the telephony line manager 20.
3. The telephony line manager 20 receives the callback message 202 that presents a call signal on line #V and notifies single line application 30 of the new call signal on virtual line #V through the LINE_CALLSTATE message 204.
4. The single line application 30 issues a command message 206 to the telephony line manager 20 to accept the new call signal on line #V, which is passed on to multiplexor 10 through accept message 208.
5. Multiplexor 10, through its internal mapping tables, maps the accept message 208 to the actual line holding the targeted call signal and sends a new TSPI_lineAccept message 210 to the service provider component 42. The call signal from service provider component 42 is then processed by the single line application 30 in its normal manner.
6. When a second call signal comes in from another service provider component 44, the LINE_NEWCALL message 212 is sent to the multiplexor 10 which searches its internal mapping tables and translates message 212 as a second call signal on virtual line #V and sends the appropriate message 214 to the telephony line manager 20.
7. Through LINE_CALLSTATE message 216, telephony line manager 20 notifies the single line application 30 that a second call signal has appeared on the virtual line #V.
8. Single line application 30 sends message 218 to telephony line manager 20 that it has chosen to hold the first call signal on the virtual line #V and sends message 220 to telephony line manager 20 that it has chosen to answer the second call signal.
9. Telephony line manager 20 sends hold message 222 and accept messages 224 to multiplexor 10 for the virtual line #V.
10. After consulting its mapping tables, multiplexor 10 sends a hold message 226 to service provider component 42 and an accept message 228 to service provider component 44. The call signal from service provider component 44 is then processed by the single line application 30 in its normal manner.

The provision of other functions is possible using processes similar to those described above, as will be understood by a person skilled in the art.

Although the invention has been described in terms of the preferred and several alternate embodiments described herein, those skilled in the art will appreciate other embodiments and modifications which can be made without departing from the sphere and scope of the invention. All such modifications are intended to be included with the scope of the claims appended hereto.

We claim:

1. A method of controlling multiple telephony line signals on a computer from multiple service providers through a single telephony line application, the method comprising:
    (a) receiving one or more telephony signals from one or more service providers;
    (b) sending one or more service provider messages, each service provider message corresponding to one of said telephony signals from said service providers to a multiplexor through a first service provider interface;
    (c) combining said telephony signals into a virtual signal;
    (d) sending one or more secondary messages corresponding to said virtual signal from said multiplexor to a telephony line manager through a second service provider interface;
    (e) sending one or more tertiary messages corresponding to said virtual signal from said telephony line manager to said single telephony line application through an application interface;
    (f) processing said tertiary messages by said single telephony line application;
    (g) sending one or more control messages from said single telephony line application to said telephony line manager corresponding to said virtual signal through said application interface;
    (h) sending one or more secondary control messages corresponding to said virtual signal from said telephony line manager to said multiplexor through said second service provider interface;
    (i) sending one or more tertiary control messages corresponding to said telephony signals from said multiplexor to each of said service providers through said first service provider interface;
    (j) processing one of said telephony signals by said single telephony line application.

2. The method of claim 1 wherein said first service provider interface and said second service provider interface are Microsoft Telephony Service Provider Interfaces.

3. The method of claim 1 wherein said application interface is a Microsoft Telephony Application Programmers Interface.

4. A method of controlling multiple telephony devices connected to a computer through a single telephony line application, the method comprising:
    (a) receiving one or more telephony signals from one or more of said telephony devices;
    (b) sending one or more device messages, each device message corresponding to one of said telephony signals from said one or more devices to a multiplexor through a first device interface;
    (c) combining said telephony signals into a virtual signal;
    (d) sending one or more secondary messages corresponding to said virtual signal from said multiplexor to a telephony line manager through a second device interface;
    (e) sending one or more tertiary messages corresponding to said virtual signal from said telephony line manager to said single telephony line application through an application interface;

(f) processing said tertiary messages by said single telephony line application;

(g) sending one or more control messages from said single telephony line application to said telephony line manager corresponding to said virtual signal through said application interface;

(h) sending one or more secondary control messages corresponding to said virtual signal from said telephony line manager to said multiplexor through said second device interface;

(i) sending one or more tertiary control messages corresponding to said telephony signals from said multiplexor to each of said one or more devices through said first device interface;

(j) processing one of said telephony signals by said single telephony line application.

5. The method of claim 4 wherein said first device interface and said second device interface are Microsoft Telephony Service Provider Interfaces.

6. The method of claim 4 wherein said application interface is a Microsoft Telephony Application Programmers Interface.

7. A method of controlling multiple telephony line signals on a computer from multiple service providers through a single telephony line application, the method comprising:

(a) receiving one or more telephony signals from one or more service providers;

(b) sending one or more service provider messages, each service provider message corresponding to one of said telephony signals from said service providers to a telephony line manager through a service provider interface;

(c) sending one or more secondary messages each corresponding to said service provider message from said telephony line manager to a multiplexing application through an application interface;

(d) passing said secondary messages to a virtual service provider;

(e) combining said secondary messages into a virtual service provider message;

(f) combining said telephony signals into a virtual signal;

(g) sending said virtual service provider messages corresponding to said virtual signal from said virtual service provider to said telephony line manager through said service provider interface;

(h) sending one or more secondary virtual messages corresponding to said virtual signal from said telephony line manager to said single telephony line application through an application interface;

(i) processing said secondary virtual messages by said single telephony line application;

(j) sending one or more virtual control messages from said single telephony line application to said telephony line manager corresponding to said virtual signal through said application interface;

(k) sending one or more secondary virtual control messages corresponding to said virtual signal from said telephony line manager to said virtual service provider through said service provider interface;

(l) passing said secondary virtual control messages to said multiplexing application;

(m) sending one or more secondary control messages corresponding to said secondary virtual control signals from said multiplexing application to said telephony line manager through said application interface;

(n) sending one or more control messages corresponding to said secondary control messages from said telephony line manager to one or more said service providers through said service provider interface;

(o) processing one of said telephony signals by said single telephony line application.

* * * * *